B. H. SKELLY.
FORCE FEED LUBRICATOR.
APPLICATION FILED NOV. 7, 1919.
1,326,142.
Patented Dec. 23, 1919.
2 SHEETS—SHEET 1.
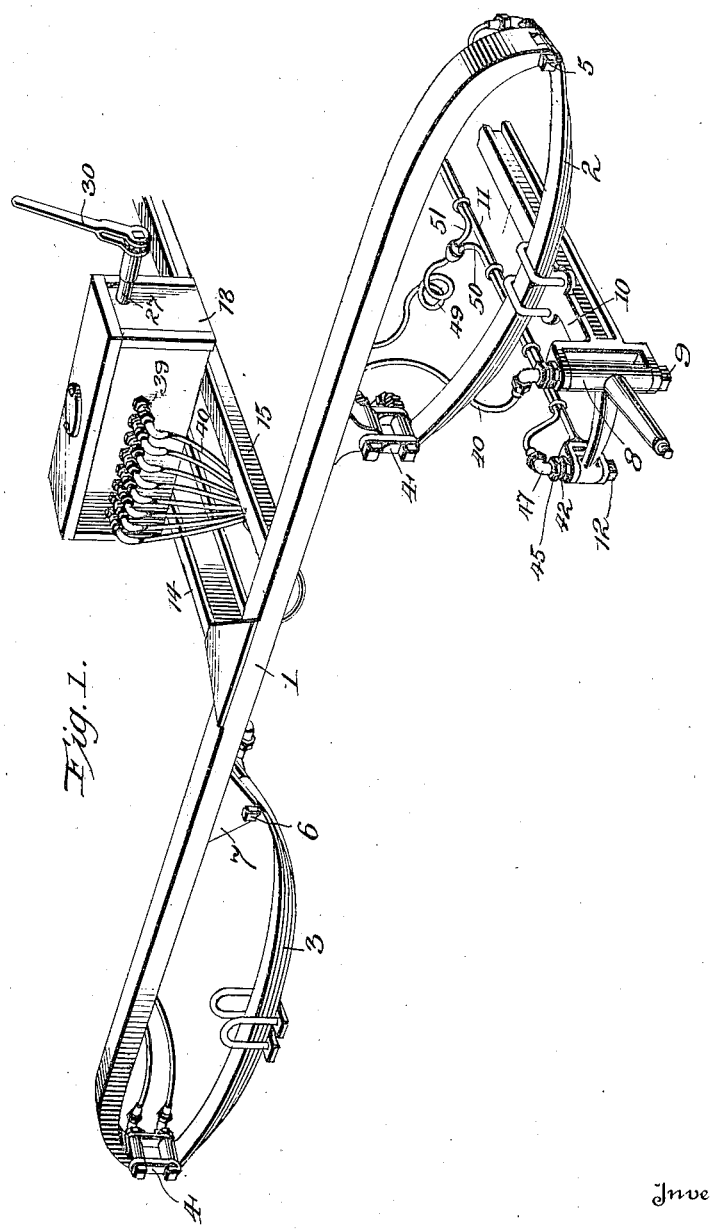

B. H. SKELLY.
FORCE FEED LUBRICATOR.
APPLICATION FILED NOV. 7, 1919.
1,326,142.
Patented Dec. 23, 1919.
2 SHEETS—SHEET 2.
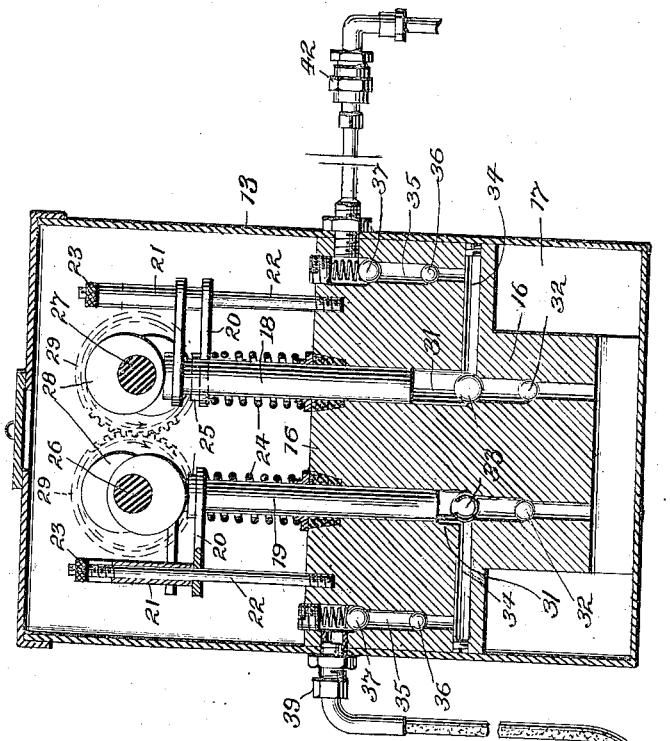
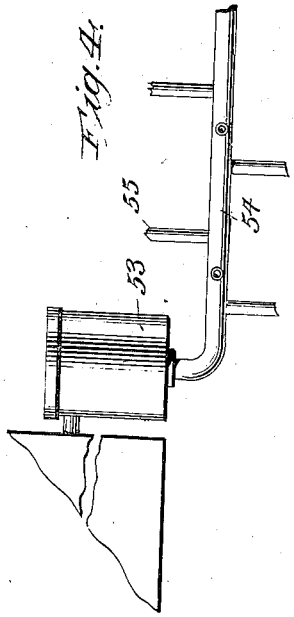
Inventor:
Bernard H. Skelly
By Dodge and Sons,
Attorneys

UNITED STATES PATENT OFFICE.

BERNARD H. SKELLY, OF BRIDGEPORT, CONNECTICUT.

FORCE-FEED LUBRICATOR.

1,326,142.  Specification of Letters Patent.  Patented Dec. 23, 1919.

Continuation in part of application Serial No. 304,241, filed June 14, 1919. This application filed November 7, 1919. Serial No. 336,265.

*To all whom it may concern:*

Be it known that I, BERNARD H. SKELLY, a citizen of the United States, residing at Bridgeport, in the county of Fairfield and State of Connecticut, have invented certain new and useful Improvements in Force-Feed Lubricators, of which the following is a specification.

This invention pertains to force feed lubricators and has to do more particularly with means for supplying oil to those bearings of a motor vehicle which are now commonly lubricated through the agency of grease cups. The employment of grease cups, or even oil cups, is attendant with many disadvantages, as will be readily appreciated by those operating motor vehicles as well as those having to do with the upkeep thereof.

The present invention provides a simple and effective means whereby those bearings which are now commonly lubricated through the agency of grease cups, many of which are not readily accessible, may all be lubricated from a common source, as, for instance, a force pump, located at a point where it is readily accessible to the driver of the vehicle, for periodic operation as occasion requires. The construction, moreover, embodies means whereby the amount of oil which is forced to any one or more bearings may be regulated and determined so that while all the bearings will receive the requisite amount no particular bearing or bearings will receive a surplus; thus wastage of the oil and consequent soiling of the car is avoided.

Means is also provided for preventing the oil from draining from the conduits which lead from the pump to the bearings, and means is likewise provided for preventing siphonic action through the conduits which would tend to drain the pump.

The invention is illustrated in the annexed drawings, wherein:

Figure 1 is a perspective view of a portion of an automobile chassis, two of the springs and a part of the steering mechanism showing the lubricating system applied thereto;

Fig. 2 a detail sectional view of the preferred form of pump which is employed, one of the conduits leading therefrom, and one of the swivel unions which is preferably employed;

Fig. 3 a detail elevation showing one of the conduit tubes in coil form so as to impart flexibility thereto immediately before such tube is joined with the union that is connected with the bearing to be lubricated, the tube being likewise connected with another union; and Fig. 4 an elevation of a portion of a pump casing showing the same discharging into an auxiliary reservoir from which leads a main trunk line with lateral leads or conduits for conducting the oil.

No novelty is herein claimed for the pump element, *per se*, as the same forms the subject matter of my Patent No. 1,317,901, dated October 7, 1919, and is set forth and claimed in my application Serial No. 287,684, filed on or about April 5, 1919, nor for the swivel unions themselves which are connected directly to the parts to be lubricated, the same forming the subject matter of my Patent 1,317,734, dated October 7, 1919, nor for the solderless pipe joint at the delivery terminal of the conduits or pipes, the same forming the subject matter of my Patent 1,317,735, dated October 7, 1919, said application Serial No. 287,684 and the applications upon which said patents aforesaid issued, being copending with my application Serial No. 304,241, filed on or about June 14, 1919, of which this present application is a continuation in part.

While I have shown a pumping system in more or less detail, the same embodying features set forth and claimed in my prior Patent 1,269,869, dated June 18, 1918, Patent 1,317,901 and application 287,684, aforesaid, I do not desire to be limited to such specific form because I can employ any desirable pumping system, though certain advantages follow in the present case by employing the particular pumping arrangement illustrated.

Referring to Figs. 1 and 2, 1 denotes the side frame of the chassis; 2 and 3 the forward and rear springs, respectively, 4 the shackle links therefor, 5 the shackle bolt at the forward end of the frame, 6 the shackle bolt connecting the forward end of the rear spring 3 to the supporting bracket 7, 8 the steering knuckle, 9 the bolt therefor which connects the knuckle to the front axle 10, 11 the drag link and 12 the bolt which connects the bifurcated end of such link to the rearwardly extending member of the knuckle 8. These parts are common in an ordinary automobile and are shown as illustrative of the adaptability of the invention to such a motor vehicle. It will, of course, be understood that many of the parts which are now commonly lubricated through the agency of grease cups are not herein shown as it is not deemed necessary to illustrate a complete machine, and, furthermore, as will be duly appreciated, each make of machine varies as to the location and number of grease cups employed.

The pump casing is denoted by 13, and in the instant case is shown as supported upon the frame members 14 and 15 extending from the frame member 1 to the opposite frame member not shown. The pump preferably takes the form shown in detail in Fig. 2, reference being made to the pump patents above mentioned and to the application 287,684. Mounted within the casing is a series of blocks 16, shown in section in Fig. 2, the lower portion of the blocks being spaced away from the bottom of the casing forming an oil reservoir or chamber, denoted generally by 17. Each block is provided with a pair of pistons or plungers 18 and 19 which preferably work in opposition to each other. Each piston at its upper end carries a laterally extending arm 20, which at its outer end has secured to it a sleeve 21 through which extends a fixed stem 22, the upper end of which is threaded and provided with a stop nut 23. A spring 24 acting upon the under face of the arm 20 and holding the same against the head 25 on the piston or plunger, serves to force the piston or plunger upwardly and likewise carries the sleeve 21 upwardly in consonance therewith. Extending through the pump casing and mounted in suitable bearings in the ends thereof are two shafts 26 and 27 each of the shafts carrying one or more cams which are offset with relation to each other so that as one series of plungers is forced downwardly the other series is moved upwardly under the action of the spring, thus in effect producing a counterbalancing, as is set forth and claimed in Patent 1,317,901. The shafts are interconnected through gears 28 and 29 and one of said shafts is extended outwardly through the casing and is provided with means whereby it may be actuated, as, for instance, through the manipulation of a ratchet hand lever 30. This lever may be made detachable and only placed upon the shaft when it is necessary to operate the pump. Each piston works in a cylinder 31 formed in the block 16 and pump valves 32 and 33 control the flow of oil from the reservoir into the cylinder. A conduit or port 34 extends from the lower end of the cylinder and communicates with a vertically disposed passage or portway 35 in which is mounted two check valves 36 and 37, the latter being held to its seat by a spring 38 in order to prevent siphoning action taking place through the conduits or pipes which lead to the parts to be lubricated. The port or way 35 is provided with a lateral opening above the check valve 37 and a fitting 39 is threaded into the same. From such fitting there extends a conduit or pipe to the particular joint to be lubricated. The conduit is preferably formed as shown in Fig. 2, of a flexible spirally wound metallic pipe, 40, which is covered by a braided tubular material 41, it being found that such a construction lends itself to proper placement of the conduits in position along the frame of the machine while preventing abrasion owing to inherent vibration which takes place while the machine is running. As just noted this construction is the preferred one but it is not, however, essential, as any tube which is oil-tight may be employed. The connection of this conduit or pipe to the fitting may be effected by any desired means, but preferably by means of the construction set forth and claimed in my Patent 1,317,735, above referred to. The opposite end of the conduit or pipe will likewise be connected in a similar manner to a union, shown in Fig. 2.

It is essential in instances where there is considerable shock and vibration such as might possibly break or crack the oil conduit or tube, that some means should be employed to take up such shock and vibration and allow for relative movement of the parts, and therefore I have provided a swivel connection in a union, as shown, such union forming the basis of Patent 1,317,734. The union is screwed into the joint, shackle bolt, connection, or the like, which is to be lubricated, and by reason of the fact that one part of the union may turn freely upon the other, no undue strain is placed upon the conduit. The union illustrated is the same as that shown and described in the patent just mentioned, and comprises an oil cup or plug 42 having a threaded stem 43 for connection with the bearing to be lubricated, such stem having an oil passage therethrough. The interior of the cup 42 is screw threaded and a swivel member 44 is mounted therein and held in position by means of a hollow sleeve nut 45 which takes in the interiorly formed threads of the cup and bears at its inner end against an enlargement formed upon the swivel member 44, a suitable packing ring 46 being interposed between the enlarged inner end of the member 44 and the wall of the element 42. An elbow 47 is threaded into the swivel member 44 and the opposite end of the said member is secured to the conduit or tube in any desirable manner. As before noted this particular union just described forms no part of my present invention since other suitable unions might be employed in this connection. I do not therefore desire to be understood as limiting myself to this form.

It is also essential to provide means in a lubricating system of the nature herein set forth, for stopping the flow of oil to the bearing to be lubricated excepting at such times as the oil is forced through the conduit tubes, and to this end I have employed check valves. The preferable location of these check valves is directly in the unions that are connected with the bearings, the valves being indicated in Fig. 2 at 48. If the check valves be located in these unions then the column of oil in the tube or conduit extending from the pumping system to the union, will be saved and will not constantly seep into the bearings so as to cause not only a wastage of oil but also over-lubrication. Of course a union might be provided at any point in a conduit tube and in connection therewith, and the check valve could be located in this union, but the oil in the conduit or tube between this union and the bearing to be lubricated would inevitably be wasted and over-lubrication would result. Such an arrangement is shown at the right hand side of Fig. 2. While I have described a specific form of union, any other suitable union might be employed in this connection.

It is likewise found expedient to employ a spring pressed check valve 37 in the pump, for such valve prevents siphonic action through the pipe or conduit as the valve 48 in such instance might be held from its seat by the flow of the oil through the conduit once it is started. While this rarely happens it is found advisable to employ the valve 37 to prevent such a possibility.

Referring to Fig. 3, the conduit immediately preceding its connection with the union is formed into coils 49 which impart still greater flexibility to the oil conduit 2 and such construction may be employed in instances where there is a great vibration or turning or twisting of the parts which might otherwise cause a break or fracture in the conduit. A specific application of this arrangement is also illustrated in Fig. 1 wherein a single conduit is branched, as at 50 and 51 and secured to the drag link 11. Such element is, of course, subject to constant movement and vibration and the coiled section of the conduit takes care of the movement at such point. Also instead of locating the check valve in the lubricating union a special auxiliary union may be utilized with which the conduit is connected and the check valve may be placed within this particular union, as shown at 52, Fig. 3, and I therefore do not wish to be limited to any particular form of flexible connection or to the placing of the check valve in any particular location.

In Fig. 4 a slight modification is shown wherein a sub-reservoir 53 may be employed supplied directly from the pump, and from such reservoir may lead one or more main trunk conduits 54 (only one shown) from which lateral conduits 55 lead directly to the bearings to be lubricated. Although this trunk conduit system may be utilized in some instances, nevertheless I prefer to employ a pumping system in which there is an individual pump for each oil conduit tube. When a system such as shown in Fig. 4 is employed check valves are located in the lubricating unions. In order to furnish less lubricant to certain bearings it will be obvious that some of the conduit tubes may be made smaller than others, and in this manner a more or less selective lubrication may be effected, and the same result may be obtained by varying the size of the oil passages in the lubricating unions. I prefer, however, to employ the pump adjustment above set forth, as the amount fed by the various pumps is thus definitely fixed and an excess of oil can not be forced to any joint.

What is claimed is,—

1. An oiling system for the bearings of a motor vehicle, other than the engine bearings thereof, comprising, in combination, such other bearings; an oil pump; means whereby said pump may be periodically operated; a conduit leading from the pump to each of the bearings; and means for preventing flow of oil through such conduits except under pressure exerted by the pump.

2. An oiling system for the bearings of a motor vehicle, other than those of the engine, comprising, in combination, such bearings; an oil pump; a conduit extending from each of said bearings to the pump; a yielding connection between the respective conduits and the bearings providing for relative movement between such bearing and the conduit.

3. An oiling system for the bearings of a motor vehicle, other than those of the engine, comprising, in combination, such bearings; an oil pump; a conduit extending from each of said bearings to the pump; yielding connections between the respective conduits and the bearings providing for relative movement between such bearings and the conduits; and means for preventing oil from flowing through the conduits except upon pressure exerted by the pump.

4. An oiling system for the bearings of a motor vehicle, other than those of the engine, comprising, in combination, such bearings; an oil pump; means whereby said pump may be periodically operated; a conduit extending from each of the bearings to the pump; yielding connections between the respective conduits and the bearings providing for relative movement between such bearings and the conduits; and means for preventing oil from flowing through the conduits except upon pressure exerted by the pump.

5. An oiling system for the bearings of a motor vehicle, other than those of the engine, comprising, in combination, such bearings; an oil pump; means whereby said pump may be periodically operated; a conduit extending from each of the bearings to the pump; yielding connections between the respective conduits and the bearings providing for relative movement between such bearings and the conduits; means for preventing oil from flowing through the conduits except upon pressure exerted by the pump; and means for preventing siphonic action through the conduits.

6. A force feed lubricating system for the bearings of a motor vehicle, other than those of the engine, comprising, in combination, such bearings; a chassis and allied parts carrying the bearings; a multi-cylinder oil pump supported upon the chassis; a piston mounted in each pump cylinder; means for actuating the pistons; conduits extending from the outlets of the various cylinders; and flexible connections between the conduits and the various bearings, whereby the bearings may have a relative movement with reference to the chassis, pump and conduits, without placing undue strain thereon.

7. A force feed lubricating apparatus, comprising a hand operated oil pumping system; an oil conduit system leading from said pumping system; unions connected to the parts to be lubricated; and single acting check valves located in said conduit system intermediate said parts and pumping system for stopping the flow of oil except when under a pressure feed.

8. A force feed lubricating apparatus, comprising a hand operated oil pumping system; oil conduit tubes leading from said system; unions connected to the parts to be lubricated; flexible connections between said tubes and unions; and single acting check valves in said unions to stop the flow of oil except when under a pressure feed.

9. A force feed lubricating apparatus for a motor vehicle to supply lubricant to a multiplicity of parts located remote from the main supply of the lubricant, comprising a manually operated pumping system; a plurality of conduit pipes leading from said system; and suitable unions which connect the extremities of said pipes with the parts to be lubricated.

10. A force feed lubricating system for the bearings of a motor vehicle, other than those of the engine, comprising, in combination, such bearings; a chassis and allied parts carrying the bearings; a multi-cylinder oil pump supported upon the chassis; a piston mounted in each pump cylinder; means for actuating the pistons; conduits extending from the outlets of the various cylinders and leading to the bearings to be lubricated; and flexible connections between the conduits and such bearings as have a relative movement with reference to the chassis.

In testimony whereof I have signed my name to this specification.

BERNARD H. SKELLY.